(No Model.)

C. WRIGHT.
BELT HOLDER.

No. 372,999. Patented Nov. 8, 1887.

ATTEST.
J. Henry Kaiser
Victor J. Evans

INVENTOR.
Charles Wright,
By L. Deane
his Attorney.

UNITED STATES PATENT OFFICE.

CHARLES WRIGHT, OF CINCINNATI, OHIO.

BELT-HOLDER.

SPECIFICATION forming part of Letters Patent No. 372,999, dated November 8, 1887.

Application filed May 21, 1887. Serial No. 238,982. (No model.)

*To all whom it may concern:*

Be it known that I, CHARLES WRIGHT, a citizen of the United States, residing at Cincinnati, in the county of Hamilton and State of Ohio, have invented certain new and useful Improvements in Belt-Holders; and I do hereby declare the following to be a full, clear, and exact description of the invention, such as will enable others skilled in the art to which it appertains to make and use the same.

Figure 1:
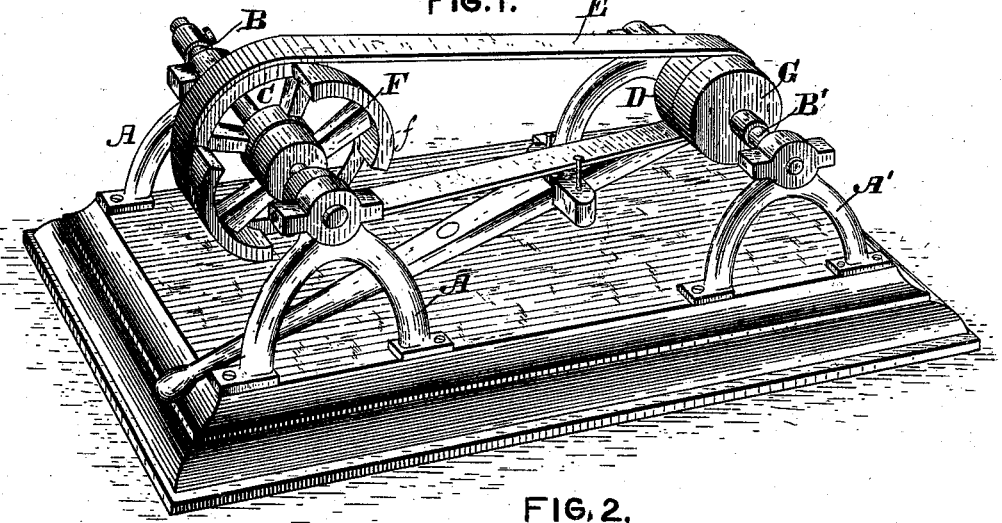
Figure 2:
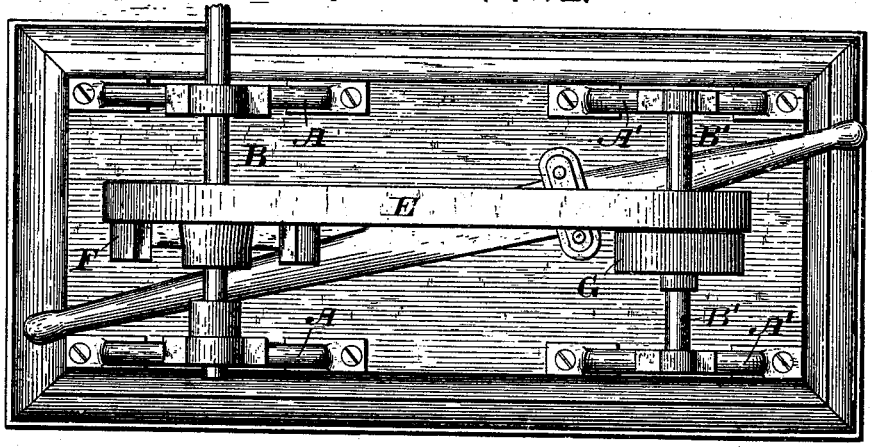
Figure 3:
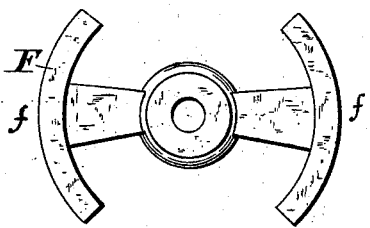
Figure 4:
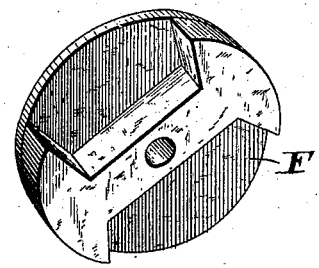

Figure 1 is a perspective view showing the present invention. Fig. 2 is a top plan view. Fig. 3 is a side elevation of the segmental wheel; Fig. 4, perspective view of a modification.

This invention is an improved belt-holder; and the novelty consists in such construction and combination of the parts as that when not in use the belt can be slackened up and remain stationary, and when desired can be shifted for use, all as will now be set out in detail and fully explained, reference being had to the accompanying drawings, in which—

A A are any suitable standards or uprights, in the upper ends of which the shaft B is suitably journaled. In like manner, and at a suitable distance from the standards A, are the standards A', in the upper ends of which the shaft B' is journaled. The belt wheel or pulley C is rigidly fixed upon the shaft B, and power is communicated to it in any desired way. In like manner the pulley D is fixed rigidly upon the shaft B'.

E is the belt, adapted to run over the pulleys C and D. This belt can be shifted at will from said pulleys upon the loose pulleys F and G, respectively upon the shafts B and B', and contiguous to the pulleys C and D, by means of the belt-shifter H.

The loose pulley F, in conjunction with the loose pulley G, constitutes the belt-holder; but in order to lessen the wear and strain upon the belt the pulley F is made segmental—that is, its rim or periphery is cut out on opposite sides, so as to leave only the portions *f f* thereof opposite each other. The consequence is that when the belt is shifted from the fast pulleys C and D upon the belt-holder, the periphery of the pulley F being so largely cut away or removed, as aforesaid, the belt will fit very loosely upon the pulleys F and G. Consequently there is an immediate decrease of tension or strain upon the belt when it is shifted from the fast to the loose pulleys; but when it is desired to shift the belt back upon the fast pulleys this can be done as easily as if the segmental pulley had a complete periphery. This segmental pulley may be made as shown in Fig. 1 or as shown in detail in Fig. 4, because in either instance only the segmental circumference of the loose pulley comes in contact with the belt. The principle in both cases is the same.

By this invention the wear upon the belt is largely decreased, and consequently a great saving is effected by its use, because it can be made to last several times longer than when the loose pulleys have a full rim.

I claim—

1. In combination with the fast pulleys C and D, the segmental pulley F and the loose pulley G, substantially as and for the purpose set forth.

2. In a device substantially as described, a loose pulley having its rim or periphery largely cut away or removed on opposite sides, whereby the belt when applied will fit loosely upon it.

In testimony whereof I affix my signature in presence of two witnesses.

CHARLES WRIGHT.

Witnesses:
 FRED TANSING,
 L. W. REIKER.